United States Patent
Ritter et al.

(10) Patent No.: US 12,330,608 B2
(45) Date of Patent: Jun. 17, 2025

(54) METHOD FOR CONTROLLING AN ELECTROMECHANICAL BRAKE SYSTEM

(71) Applicant: AKEBONO BRAKE INDUSTRY CO., LTD., Tokyo (JP)

(72) Inventors: George Douglas Ritter, Pleasant Ridge, MI (US); Keqin Xu, Farmington Hills, MI (US); Jason Sun, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 190 days.

(21) Appl. No.: 18/078,387

(22) Filed: Dec. 9, 2022

(65) Prior Publication Data

US 2024/0132042 A1  Apr. 25, 2024

Related U.S. Application Data

(60) Provisional application No. 63/416,221, filed on Oct. 14, 2022.

(51) Int. Cl.
*B60T 17/22* (2006.01)
*B60T 8/92* (2006.01)
(Continued)

(52) U.S. Cl.
CPC .............. *B60T 17/221* (2013.01); *B60T 8/92* (2013.01); *B60T 13/588* (2013.01);
(Continued)

(58) Field of Classification Search
CPC .......... B60T 7/107; B60T 8/92; B60T 13/588; B60T 13/741; B60T 17/221; B60T 2201/10; B60T 2270/406; B60T 2270/88
See application file for complete search history.

(56) References Cited

U.S. PATENT DOCUMENTS 4,561,527 A    12/1985   Nakamoto et al.
4,629,043 A    12/1986   Matsuo
(Continued)

FOREIGN PATENT DOCUMENTS

DE    102011078900 A1    1/2013
EP         3436321 A1    2/2019
(Continued)

OTHER PUBLICATIONS

European Search Report, EP Application No. 23203373 dated Mar. 6, 2024.
(Continued)

*Primary Examiner* — Mark L. Greene
(74) *Attorney, Agent, or Firm* — The Dobrusin Law Firm, P.C.

(57) ABSTRACT

A method of controlling an electromechanical brake system. The method comprises measuring a voltage of a motor, measuring a current of the motor, and estimating a position of a component of the electromechanical brake system based on the voltage and the current. The method comprises estimating a force imposed by the component based on the voltage and the current, and estimating a hydraulic pressure associated with a hydraulic brake system. In an apply operation, the force of the component is corrected based on the hydraulic pressure. In a release operation, the position of the component is corrected based on the hydraulic pressure.

20 Claims, 5 Drawing Sheets

(51) Int. Cl.
   *B60T 13/58*   (2006.01)
   *B60T 13/74*   (2006.01)
   *B60T 7/10*    (2006.01)

(52) U.S. Cl.
   CPC ............ *B60T 13/741* (2013.01); *B60T 7/107* (2013.01); *B60T 2201/10* (2013.01); *B60T 2270/406* (2013.01); *B60T 2270/88* (2013.01)

(56) References Cited

U.S. PATENT DOCUMENTS

| | | | |
|---|---|---|---|
| 8,201,897 | B2 | 6/2012 | Bell, Jr. et al. |
| 8,926,889 | B2 | 1/2015 | Wilson et al. |
| 9,340,212 | B2 | 5/2016 | Tao et al. |
| 10,137,878 | B2 | 11/2018 | Ritter |
| 10,351,113 | B2 | 7/2019 | Mannherz et al. |
| 10,730,502 | B2 | 8/2020 | Sevel et al. |
| 2010/0181823 | A1 | 7/2010 | Eberling |
| 2012/0161508 | A1 | 6/2012 | Beever et al. |
| 2013/0056315 | A1 | 3/2013 | Bieltz et al. |
| 2016/0355171 | A1 | 12/2016 | Mannherz et al. |
| 2017/0321773 | A1 | 11/2017 | Lee et al. |
| 2017/0345249 | A1 | 11/2017 | Beever et al. |
| 2018/0029573 | A1 | 2/2018 | Englert et al. |
| 2020/0031324 | A1 | 1/2020 | Cimpoesu et al. |
| 2020/0173508 | A1 | 6/2020 | Michels et al. |
| 2020/0263748 | A1 | 8/2020 | Ritter |
| 2024/0166177 | A1* | 5/2024 | Saotome ................. B60T 8/171 |

FOREIGN PATENT DOCUMENTS

| | | |
|---|---|---|
| EP | 3463999 B1 | 6/2020 |
| JP | 2002-160615 A | 6/2002 |
| JP | 2006-036196 A | 2/2006 |
| JP | 2006-224783 A | 8/2006 |
| JP | 2014504231 A | 2/2014 |
| JP | 2016-011081 A1 | 1/2016 |
| JP | 2017210031 A | 11/2017 |
| JP | 2022-056861 A | 4/2022 |
| WO | 2019188141 A1 | 10/2019 |
| WO | 2022/202243 A1 | 9/2022 |

OTHER PUBLICATIONS

Japanese Office Action, JP Application No. 2023-174865 dated Sep. 27, 2024.

* cited by examiner

| FL | FR | RL | RR | Speed Est. |
|---|---|---|---|---|
| ✓ | ✓ | ✓ | ✓ | Min[Max(FL, RR), Max(FR, RL)] |
| X | ✓ | ✓ | ✓ | Min[RR, Max(FR, RL)] |
| ✓ | X | ✓ | ✓ | Min[Max(FL, RR), RL)] |
| X | X | ✓ | ✓ | Fault value |
| ✓ | ✓ | X | ✓ | Fault value |
| ✓ | ✓ | ✓ | X | Fault value |
FIG. 1
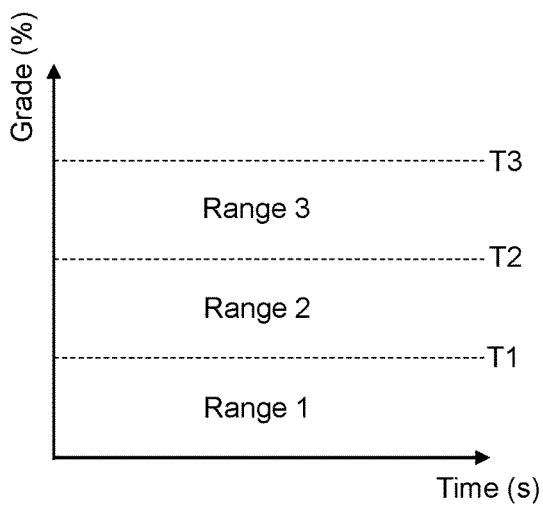
FIG. 2A
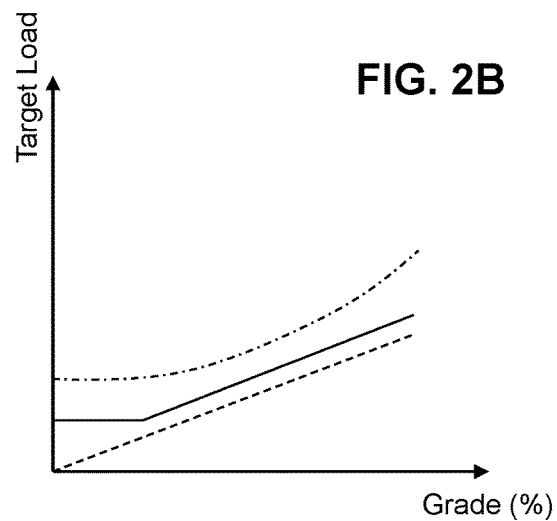
FIG. 2B

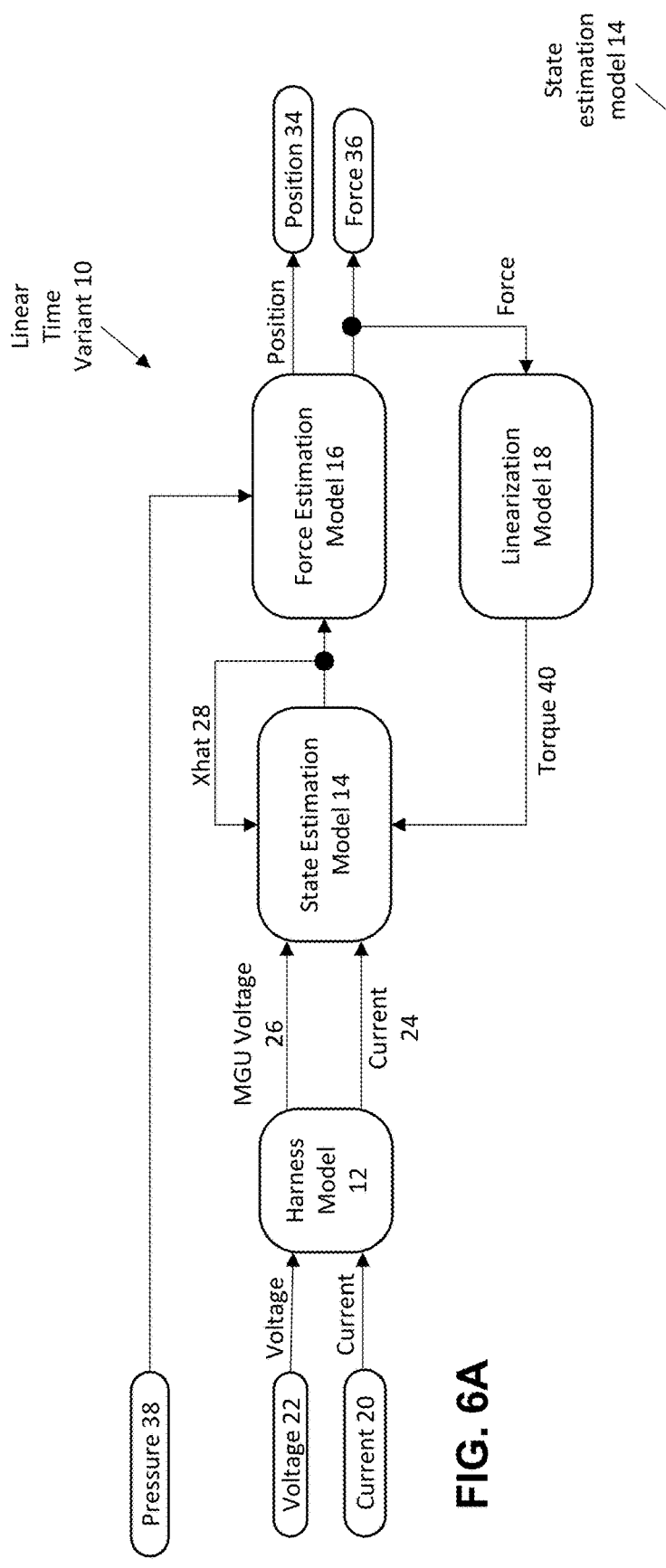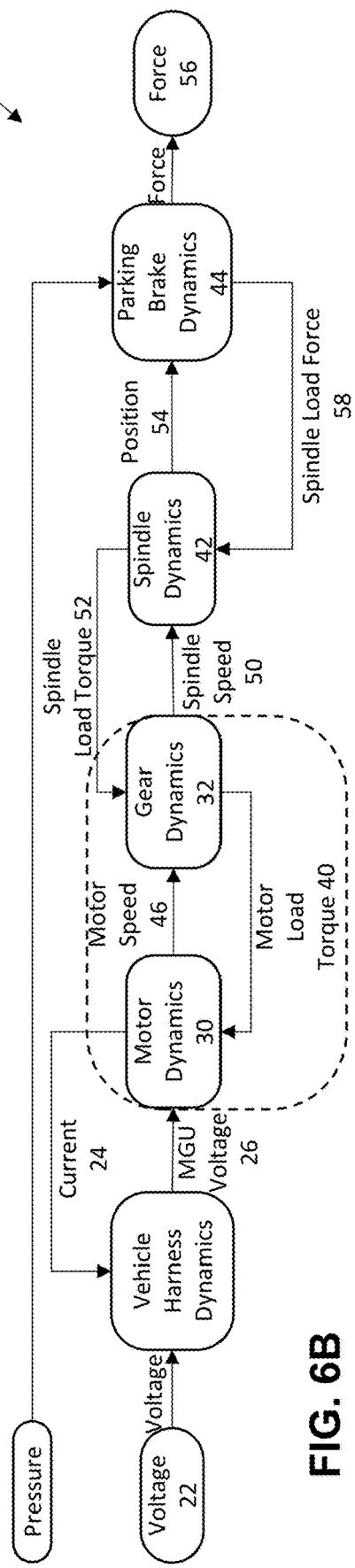
FIG. 6A
FIG. 6B

METHOD FOR CONTROLLING AN ELECTROMECHANICAL BRAKE SYSTEM

FIELD

The present teachings generally relate to a method for controlling an electromechanical brake system. The method may account for the hydraulic pressure of a hydraulic brake system.

BACKGROUND

Many vehicles are manufactured with a parking pawl within the transmission or driveline assembly. In a parking operation, the pawl provides a backup in the case that the parking brake encounters a fault or degraded condition that causes an applied load to fall below the load required to keep the vehicle static. In these types of vehicles, parking brake control is coupled. That is, a single controller controls both the driver and passenger side of the vehicle. Coupled control typically does not account for fault or degraded conditions since the system can rely upon the pawl. Thus, in the event of, e.g., a controller or sensor fault, the pawl can be relied upon to keep the vehicle static. Where a vehicle is constructed without a pawl, fault redundancy should be addressed.

In the control of a parking brake, an actuator mechanism can be controlled to ensure that the applied load is commensurate with the grade the vehicle is situated on. Application of a load that exceeds the grade requirements can reduce the service life of the braking system. To determine grade, dedicated sensors could be employed. However, this solution requires extra costs and manufacturing complexity, as well as having implications in vehicle weight and packaging space. Existing sensor inputs in the vehicle can be employed. However, fault redundancy should be established to ensure correct operation of the system in the event sensor inputs are unavailable and/or a braking system is not operating correctly or at all.

Some vehicle brake systems employ both electromechanical systems ("electromechanical parking brake systems" or "EPB systems") and hydraulic systems ("hydraulic service brake systems" or "HSB systems") to act upon pistons that move one or more brake pads against a brake disc ("rotor") to impose a braking load thereon. Typically, the electromechanical system is employed during a parking brake operation and the hydraulic system is employed during a service brake operation, although one or both may be employed during either brake operation.

Superposition of load from the electromechanical and hydraulic systems can occur if the operation thereof overlaps. For example, a driver parking a vehicle can apply the service brake to bring the vehicle to a stop and while the service brake is active, apply the parking brake. As another example, a driver preparing to drive from a parked position can apply the service brake prior to releasing the parking brake. As another example, an electromechanical or hydraulic support system may supplement the operation of an electromechanical or hydraulic primary system in the event of the primary system's malfunction. One concern with load superposition is surpassing the maximum recommended load on the brake system, risking the reduction in its service life. Another concern is energy efficiency. Operating an electromechanical brake system at higher torques associated with exceeding a maximum load unnecessarily expends energy.

Brake systems typically operate with a running clearance between brake pads and brake discs when neither an electromechanical nor a hydraulic system are operational. The running clearance ensures that the vehicle's wheels can spin freely and without frictional engagement between the brake pads and the brake discs. The running clearance can shift when the operation of electromechanical and hydraulic brake systems overlap as the operation of the hydraulic system can cause the perceived or estimated position of an electromechanical actuator to deviate from its actual position due to deflection induced by the hydraulic brake system.

A sensor can be employed to determine the position of an electromechanical actuator. However, additional sensors increase the cost and manufacturing complexity, as well as having implications in vehicle weight and packaging space. Some have proposed consideration of hydraulic pressure in the operation of an electromechanical brake system. However, existing methods differ in which sensor inputs are employed. Moreover, fault redundancy remains a concern. Some existing methods employ open loop control whereby no feedback is provided to correct the estimated actuator position or force application. However, due to the unpredictable nature of a hydraulic brake system's influence on an electromechanical brake system's operation, open loop control can result in inaccurate operation of the electromechanical brake system. U.S. Pat. No. 10,137,878, incorporated herein by reference in its entirety for all purposes, describes a closed loop control method whereby position and/or force of an electromechanical brake system is estimated based on a voltage and/or current measurement. However, consideration of pressure applied by a hydraulic brake system is not proposed in the patent.

It would be desirable to provide a method of controlling an electromechanical brake system to be employed in a vehicle with or without a parking pawl.

It would be desirable to provide a method of controlling an electromechanical brake system to account for vehicle grade.

It would be desirable to provide a method of controlling an electromechanical brake system using existing sensor inputs and that obviates the need to add additional sensors to a vehicle.

It would be desirable to provide a method of controlling an electromechanical brake system that provides fault redundancy.

It would be desirable to provide a method of controlling an electromechanical brake system in a decoupled manner, whereby separate controllers control the driver and passenger sides of the vehicle.

It would be desirable to provide a method of controlling an electromechanical brake system whereby a fault or degraded condition is communicated between decoupled controllers associated with both a driver side and passenger side of a vehicle.

It would be desirable to provide a method of controlling an electromechanical brake system to avoid applying loads in excess of requirements for a particular grade condition.

It would be desirable to provide a method of controlling an electromechanical brake system in a closed loop such that feedback is accounted for in the regulation of the system.

It would be desirable to provide a method of controlling an electromechanical brake system to avoid applying a maximum load or greater upon brake pads.

It would be desirable to provide a method of controlling an electromechanical brake system that accounts for the hydraulic pressure in a hydraulic brake system.

It would be desirable to provide a method of controlling an electromechanical brake system to maintain a running clearance between brake pads and a brake disc.

SUMMARY

The present disclosure relates to a method of controlling an electromechanical brake system, which may address at least some of the needs identified above. The method may comprise measuring a voltage of a motor, measuring a current of the motor, and estimating a position of a component of the electromechanical brake system based on the voltage and the current.

The method may comprise estimating a force imposed by the component based on the voltage and the current, and estimating a hydraulic pressure associated with a hydraulic brake system.

In an apply operation, the force of the component may be corrected based on the hydraulic pressure.

In a release operation, the position of the component may be corrected based on the hydraulic pressure.

The hydraulic pressure may be estimated from a sensor input. The sensor input may be determined based upon a logic table. The logic table may account for fault or degraded conditions.

The hydraulic pressure may be estimated from a first pressure associated with a left wheel cylinder, a second pressure associated with a right wheel cylinder, a third pressure associated with a master cylinder, or any combination thereof. The first, second, and/or third pressures may be obtained from respective pressure sensors associated with the left wheel cylinder, the right wheel cylinder, and/or the master cylinder. The first, second, and/or third pressures may be estimated from another sensor input.

If both the first pressure sensed at the left wheel cylinder and the second pressure sensed at the right wheel cylinder are available, the estimated hydraulic pressure may be an average of both.

If only one of the first pressure sensed at the left wheel cylinder and the second pressure sensed at the right wheel cylinder is available, the estimated hydraulic pressure may be the first pressure or the second pressure, whichever is available.

If neither the first pressure sensed at the left wheel cylinder nor the second pressure sensed at the right wheel cylinder are available, the estimated hydraulic pressure may be the third pressure sensed at the master cylinder.

If none of the first pressure sensed at the left wheel cylinder, the second pressure sensed at the right wheel cylinder, and the third pressure sensed at the master cylinder are available, the estimated hydraulic pressure may be set to a default value.

The component may be a spindle nut, a spindle, a component of a motor assembly, or any combination thereof.

The method may further comprise rotating the spindle about an axis with the motor in a first direction so that the spindle nut moves one or more brake pads against a braking surface; and/or rotating the spindle about the axis with the motor in a second direction so that the one or more brake pads move away from the braking surface.

In the apply operation, said correction may mitigate and/or prevent damage arising from a load superposition of the electromechanical brake system with the hydraulic brake system. In the release operation, said correction may mitigate and/or prevent damage arising from residual caliper drag.

Control of the electromechanical brake system may be closed loop.

The method may further comprise estimating a vehicle grade. The method may further comprise regulating the electromechanical brake system to the force imposed by the component based on the vehicle grade.

The method may further comprise obtaining a longitudinal acceleration of a vehicle. The vehicle grade may be estimated based on the longitudinal acceleration.

In the event of fault or degraded conditions, the force may be set to a default force. The fault or degraded conditions may include no longitudinal acceleration being available, the longitudinal acceleration exceeding a maximum value, the longitudinal acceleration falling below a minimum value, or any combination thereof.

The method may further comprise obtaining a wheel speed. The wheel speed may determine if the vehicle is static or dynamic. The vehicle grade may be only estimated if the vehicle is static.

The wheel speed may be a minimum value of a maximum wheel speed of a first diagonal wheel set and a maximum wheel speed of a second diagonal wheel set. The first diagonal wheel set may include a front left wheel and a rear right wheel. The second diagonal wheel set may include a front right wheel and a rear left wheel.

In the event of fault or degraded conditions for the front left wheel or the front right wheel, a wheel speed of a corresponding rear wheel in the first diagonal wheel set or the second diagonal wheel set may be considered in determining the minimum value.

In the event of fault or degraded conditions for both of the front left wheel and the front right wheel, the wheel speed may be set to a default value.

In the event of fault or degraded conditions for either of the rear left wheel or the rear right wheel, the wheel speed may be set to the default value.

If the wheel speed is below a static threshold for a pre-determined duration, the vehicle may be assumed static. If the wheel speed is above a dynamic threshold for the pre-determined duration, the vehicle may be assumed dynamic.

The force may be determined based upon the vehicle grade.

The force may be determined by the vehicle grade falling within discrete ranges of vehicle grades and/or the force may be modelled as a function of the vehicle grade. The function may be linear, non-linear, or piecewise.

The method may further comprise detecting, by a first controller, a fault or degraded condition associated with a first brake caliper to which the first controller is assigned. The method may further comprise communicating, by the first controller, the fault or degraded condition to a second controller assigned to a second brake caliper. The method may further comprise setting the force associated with the second brake caliper to a default force.

The first controller and the first brake caliper may be located on a passenger side of a vehicle; and the second controller and the second brake caliper may be located on a driver side of the vehicle, or vice versa.

BRIEF DESCRIPTION OF THE DRAWINGS

FIG. 1 illustrates a fault redundancy scheme according to the present teachings.

FIG. 2A illustrates a graph of grade ranges according to the present teachings.

FIG. 2B illustrates a graph of target load as a function of grade according to the present teachings.

FIG. 6A illustrates a model for a flow diagram or control model of the linear time variant estimation (LTV) according to the present teachings.

FIG. 6B illustrates a flow diagram of the subcomponents of the state estimation model of the LTV of FIG. 6A.

DETAILED DESCRIPTION

Figure 3A:
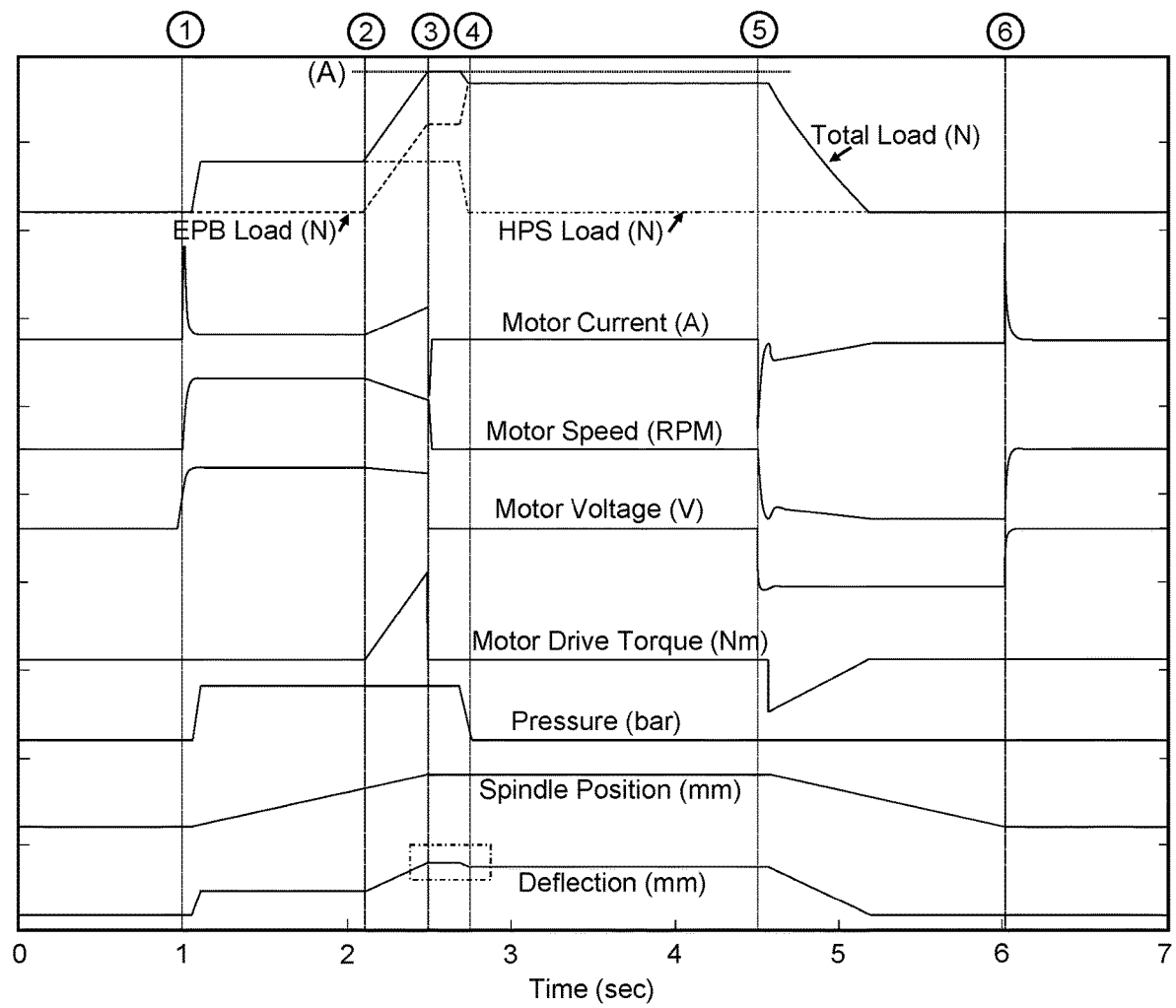
FIG. 3A illustrates a graph of a parking brake and service brake operating parameters as a function of time according to the present teachings.

The method of the present disclosure may be employed with a brake system. The brake system may function to slow, stop, restrict, and/or prevent movement of a vehicle. The brake system may function to apply a load that slows, stops, restricts, and/or prevents rotation of a brake disc; slows, stops, restricts, and/or prevents movement of a vehicle, or both. The load may be applied during a parking brake operation, which, when a vehicle is in a stopped or parked position, may restrict or prevent rotation of a brake disc; restrict or prevent movement of a vehicle, or both.

The brake system may be any system or assembly that performs the aforementioned functions. For example, the brake system may be an opposing brake system (i.e., a fixed caliper brake system), a floating brake system (i.e., a floating caliper), a parking brake assembly, a drum-in-hat system, or a combination thereof.

The brake system may be used with any vehicle to perform the aforementioned functions. For example, the brake assembly may be used with any light-duty passenger vehicle (e.g., a car, truck, sports utility vehicle, or the like), or any heavy-duty vehicle (e.g., a full-size truck, van, sports utility vehicle, etc.).

The brake system may include one or more brake calipers. The brake calipers may function to house, contain, and/or provide for the attachment and function of any of the components of an electromechanical brake system, a hydraulic brake system, or both.

The brake caliper may function to provide for the movement of one or more brake pads relative to a brake disc. The brake caliper may move during an apply operation (i.e., a floating caliper), or the brake caliper may be fixed so that the brake caliper does not move during an apply operation (i.e., a fixed caliper). The brake caliper may include one or more support brackets for engaging the one or more brake pads. The one or more support brackets may be arranged around a brake disc so that one or more brake pads are located on an inboard side of the brake disc and one or more brake pads are located on an outboard side of the brake disc.

Inboard may refer to a side of the brake disc facing toward a longitudinal centerline of a vehicle. Outboard may refer to a side of a brake disc facing away from a longitudinal centerline of a vehicle.

The apply operation may refer to moving one or more brake pads toward the brake disc. Accordingly, the apply direction may refer to a direction toward the brake disc. The release operation may refer to moving one or more brake pads away from the brake disc. Accordingly, the release direction may refer to a direction away from the brake disc.

The brake disc may cooperate with one or more elements of the brake system in an apply operation and/or a release operation. The brake disc may be at least partially surrounded by a brake caliper. The friction material of one or more brake pads may face an inboard side of the brake disc and the friction material of one or more brake pads may face an outboard side of the brake disc.

During an apply operation, the friction material of the one or more brake pads may be moved into contact with the or more sides of the brake disc so that the brake disc, the vehicle, or both are slowed, stopped, and/or restricted. During an apply operation, the friction material of the one or more brake pads may be moved into contact with the one or more sides of the brake disc so that a stopped or parked vehicle or brake disc is restricted from moving or rotating, respectively.

The one or more brake pads may cooperate with one or more elements of the brake assembly in an apply operation. The apply operation may be associated with a service brake or a parking brake. For example, in an apply operation, the friction material of the one or more brake pads is moved into contact with any surface, such as the one or more sides of the brake disc. The one or more brake pads may move in unison together, individually, sequentially, or a combination thereof.

The one or more brake pads may move in a release operation. For example, in a release operation, the friction material of the one or more brake pads is moved away from and/or out of contact with any surface, such as the one or more sides of the brake disc. The one or more brake pads may move in unison together, individually, sequentially, or a combination thereof.

The brake system may include one or more piston assemblies. The one or more piston assemblies may function to move the one or more brake pads towards and/or away from any surface in an apply and/or release operation, respectively. The one or more piston assemblies may function to transfer or translate a rotational torque or force into a linear force to axially move the one or more brake pads relative to a brake disc.

The one or more piston assemblies may be in selective engagement with the pressure plate of one or more brake pads. For example, in an apply operation one or more piston assemblies engage one pressure plate to move the friction material disposed on the pressure plate toward the brake disc.

Each of the one or more piston assemblies may include one or more pistons, one or more spindle nuts, and one or more spindles, which together may function to perform the previously recited functions.

The one or more pistons may function to move the one or more brake pads relative to any surface in an apply operation or a release operation. The one or more pistons may move towards or away from a brake pad along a piston axis. The one or more pistons may move in and out of a corresponding piston opening or bore.

The one or more pistons can be moved towards or away from the one or more brake pads via any fluid, via any mechanical device or linkage such as a spindle nut and spindle, or a combination thereof. Preferably, during a service brake operation, the one or more pistons are moved via pressure applied to a fluid. Preferably, during a parking brake operation, the one or more pistons are moved via a motor gear unit connected to a linkage including a spindle nut and a spindle.

The one or more spindle nuts may function to engage the one or more pistons so that the one or brake pads can move relative to a brake disc in an apply operation and/or a release operation. The one or more spindle nuts may engage a corresponding piston via any suitable engagement or attachment. For example, the engagement may be a threaded engagement, a sliding engagement, an interference engagement, a permanent engagement, a removable engagement, a keyed engagement, the like, or a combination thereof.

A moving force (e.g., supplied from a motor gear unit, worm wheel, spindle, output shafts, etc.) may be applied to the one or more spindle nuts so that the one or more pistons move along a respective piston axis relative to a brake pad. The one or more spindle nuts may at least partially move relative to the piston without the piston and/or the brake pad actually moving relative to the brake disc (i.e., a gap may extend between a spindle nut and the piston pocket). In other words, the spindle nut may be moved axially a certain distance before the nut actually moves the piston and/or the brake pad.

The one or more spindles may function to engage the one or more pistons, spindle nuts, or both so that the one or brake pads can move relative to a brake disc. The one or more spindles may be in communication with a respective worm wheel, output shaft, or both, and may cooperate with a respective spindle nut to translate a rotational force received from a motor gear unit, output shaft, worm wheel, differential, etc. into a linear force to move the pistons along respective piston axis.

The one or more spindles may engage the corresponding spindle nuts, via any suitable engagement or attachment for performing the aforementioned functions. Preferably, the engagement may be a threaded engagement. For this, each of the one or more spindles may include one or more threaded portions. The one or more spindles may be rotated or translated in an apply direction to move the spindle nut, the piston, and/or the brake pad towards the brake disc. The one or more spindles may be rotated or translated in a release direction to move the spindle nut, the piston, and/or the brake pad away from the brake disc. It is within the scope of the present disclosure that the one or more spindles, the one or more spindles nuts, and/or the one or more pistons may be a single component and still function in the aforementioned manner.

One or more worm wheels may be in communication with a respective spindle. The one or more worm wheels may function to receive and transfer a rotational force or torque to the one or more spindles so that the one or more brake pads can move relative to the brake disc. The rotational force may be supplied by or from a motor gear unit, a respective output shaft, a differential, etc. The one or more worm wheels may rotate in an apply direction to move a corresponding spindle so that, ultimately, a corresponding brake pad moves towards the brake disc. The one or more worm wheels may rotate in a release direction to move a corresponding spindle so that, ultimately, the corresponding brake pad moves away from the brake disc.

Each worm wheel may include a flange or opening engaging a respective spindle. The engagement may be any suitable engagement for performing the aforementioned functions. Exemplary engagements may include, but are not limited to a threaded engagement, a sliding engagement, an interference engagement, a permanent engagement, a removable engagement, a keyed engagement, a magnetic engagement, the like, or a combination thereof. Each worm wheel may include features for engaging a respective output shaft, worm, motor gear unit, differential, or a combination thereof.

The one or more output shafts may function to provide or transfer a rotational force or torque. More specifically, the one or more output shafts may function to receive a rotational force or torque generated or provided from a motor gear unit, a differential, or both and transfer said rotational force or torque to a respective piston assembly, worm wheel, or both. The one or more output shafts may include any suitable engagement for transferring said rotational force or torque to the respective piston assembly, worm wheel, or both. For example, the one or more output shafts may include one or more worms and/or teeth, which may engage a corresponding worm wheel.

The one or more output shafts may include one or more bearings, counterweights, or both to assist in the rotation thereof (i.e., may create a low friction device). The one or more bearings may also function to connect and support each respective output gear to a brake caliper, or a housing or enclosure.

The one or more output shafts may be ultimately rotated by one or more motors and/or motor gear units. One or more linkages may translate torque generated by the one or more motors and/or motor gear units to the one or more output shafts.

The one or more motor gear unit may be any device or combination of devices that may function to generate or provide a force or torque suitable for an apply operation and/or a release operation. For example, the one or more motor gear units may include a DC motor, a series-wound motor, a shunt wound motor, a compound wound motor, a separately exited motor, a servomotor, or a permanent magnet motor.

The one or more motor gear units may include one or more gears that may function to transfer, increase, decrease, or a combination thereof any output force or torque generated by the motor.

The one or more motor gear units may be located within a housing. The housing may be integrally formed with the brake caliper or removably attached to the brake caliper.

The one or more motor gear units may directly or indirectly (i.e., via one or more linkages, piston assemblies, etc.) move the one or more pistons, brake pads, or both towards and/or away from the brake disc. The one or more motor gear units may generate a rotational force or torque, which is sufficient to move the one or more piston assemblies, brake pads, or both relative to the one or more brake pads. The one or more motor gear units may generate a holding force sufficient to maintain one or more brake pads against a brake disc.

The method may comprise one or more of the following steps. Some of the steps may be duplicated, removed, rearranged relative to other steps, combined into one or more steps, separated into two or more steps, or a combination thereof.

The present method may be performed at least in part by one or more controllers. The controllers may execute computer-executable instructions that direct the performance of the method. The controller may be on-board or off-board of a wheel. The controller may be an existing controller on the vehicle. The existing controller may include a booster controller, electronic stability controller, the like, or any combination thereof. Any controller employed in a vehicle may be suitable for performing the method of the present teachings. The controller may be a dedicated controller for performing the present method. That is, the dedicated controller may exclusively execute the present method. The present disclosure provides for a method for operating an electromechanical brake system. During a parking brake operation of an electromechanical system, a load is applied to a brake disc. The load may be commensurate with the grade (slope) upon which the vehicle is parked to ensure that the vehicle remains stationary.

The method may comprise estimating a vehicle grade. The vehicle grade may be estimated when the estimated vehicle state is static. The vehicle grade may be estimated based on the longitudinal acceleration and/or wheel speed of the vehicle. The method may comprise obtaining a longitudinal acceleration of the vehicle. The grade may be estimated per the following equation, where Ax is the longitudinal acceleration and G is the gravitational constant.

$$\text{Grade}=\text{TAN}[\text{ARCSIN}(Ax/G)]$$

The method may comprise communicating the estimated vehicle grade to one or more operational modules.

The method may comprise regulating the electromechanical brake system to a first load determined by the operational module based on the estimated vehicle grade. The first load may be determined based upon the vehicle grade.

The method may comprise obtaining a longitudinal acceleration of a vehicle. The vehicle grade may be estimated based on the longitudinal acceleration.

In the event of fault or degraded conditions of one module, the first load may be set to a default load for another functional module. The default load may be from about 5% to about 11%, more preferably from about 6% to about 10%, or even more preferably from about 7% to about 9% (e.g., 8%). The fault conditions may include no longitudinal acceleration being available, the longitudinal acceleration exceeding a maximum value, or the longitudinal acceleration falling below a minimum value.

As referred to herein, fault condition and degraded condition may be used interchangeably with respect to the consequence realized by the present method. Moreover, the term fault redundancy may apply to fault conditions and/or degraded conditions. That is, for example, a default load may be set upon the detection of a fault condition and likewise a degraded condition. A fault condition may refer to any input or operation that is not available (e.g., if an actuator is frozen, broken, or the like). By way of example, a fault condition may be present if an electromechanical actuator encounters stiction. A degraded condition may refer to any input or operation that is available but does not operate correctly.

The method may comprise obtaining a wheel speed. The wheel speed may determine if the vehicle is static or dynamic. The vehicle grade may only be estimated if the vehicle is static. The wheel speed may be the minimum value of a maximum wheel speed of a first diagonal wheel set, including a front left wheel and a rear right wheel, and a maximum wheel speed of a second diagonal wheel set, including a front right wheel and a rear left wheel.

In the event of fault or degraded conditions for the front left wheel or the front right wheel, the wheel speed of the corresponding rear wheel in the first or second diagonal wheel set may be considered in the minimum value determination. In the event of fault or degraded conditions for both of the front left wheel and the front right wheel, the wheel speed may be set to a default value. In the event of fault or degraded conditions for either of the rear left wheel or the rear right wheel, the wheel speed may be set to the default value.

If the wheel speed is below a static threshold for a pre-determined duration, the vehicle may be assumed static. If the wheel speed is above a dynamic threshold for the pre-determined duration, the vehicle may be assumed dynamic.

Discrete ranges of grades may be assigned to a load value. By way of example, below a first threshold the first load is set to a first range and above the first threshold the first load is set to a second range.

The first load may be modelled as a function of grade. The first load may have a linear, non-linear, or piecewise relationship to grade.

The first load may be adjusted based on a hydraulic pressure of a hydraulic brake system. Hydraulic pressure may impose a second load on the piston. Thus, the first load may be adjusted accounting for the second load. The first load may be adjusted to avoid the superposition of the first and second loads meeting or exceeding a maximum load threshold. The first load may be adjusted to account for relaxation of the electromechanical brake system.

The method may comprise determining the presence or absence of a fault or degraded condition. The fault or degraded condition may be associated with the electromechanical brake system. The fault or degraded condition may be detected by a controller dedicated to a brake caliper (e.g., a left-hand brake caliper) and communicated to a controller dedicated to another brake caliper (e.g., right-hand brake caliper). The method, upon detection of a fault or degraded condition in one or more controllers and/or brake calipers, may comprise directing one or more non-fault brake calipers to apply a maximum default load. The maximum default load applied during fault or degraded conditions may supersede the load determined by vehicle grade, as discussed hereinbefore.

An actuator may adjust its target load during an apply operation or after an apply operation is completed. While a first actuator is in an apply operation or after the first actuator has completed an apply operation, a second actuator may encounter a fault or degraded condition. In this regard, the operational actuator may adjust the target load to a max default load.

The present method may be employed with a coupled and/or decoupled brake system. In a coupled brake system, one controller may operate two or more brake calipers (e.g., a left-hand brake caliper and a right-hand brake caliper). The controller may be associated with a vehicle system such as an electronic stability controller or an electronic booster controller, although controllers associated with any other vehicle system are contemplated by the present teachings. In a decoupled brake system, each brake caliper is operated by dedicated controllers. The controllers may be associated with vehicle systems, such as an electronic stability controller and an electronic booster controller, although controllers associated with any other vehicle system are contemplated by the present teachings.

In a coupled system, parking pawls are typically employed for fault redundancy. That is, in the event of a fault or degraded condition in one or both brake calipers, in the controller, or both, the parking pawl can be relied upon to keep the vehicle static. In a decoupled system, parking pawls may not be present as a separate controller and brake caliper can provide for fault redundancy over the controller and/or brake caliper that is experiencing the fault or degraded condition.

The present disclosure contemplates that the present method may be employed with a coupled system with or without a parking pawl. The present disclosure contemplates that the present method may be employed with a decoupled system with or without a parking pawl.

The present disclosure provides for a method for operating an electromechanical brake system without relying on a position sensor to determine the position of the motor, electromechanical actuator assembly, and/or brake piston. The method may employ a control logic for accurately estimating and determining a position of an actuator assembly (e.g., spindle and nut), a position of the brake piston, a position of the motor, current draw by the motor, motor speed, an amount of parking brake force or clamping force, or any combination thereof, as depicted and discussed with respect to FIG. 6A and FIG. 6B. Such control logic is described in U.S. Pat. No. 10,137,878 B2, incorporated herein by reference in its entirety for all purposes. The control logic described therein is modified by the consideration of pressure associated with a hydraulic actuator system described herein.

The parking brake system in a disc brake system, drum-in-hat brake system, or both may have control logic for accurately estimating and determining a position of the actuator assembly (e.g., the spindle and the nut), a position of the brake piston, a position of the motor, current draw by the motor, motor speed, an amount of parking brake force or clamping force, or a combination thereof. The control logic may be embedded in a controller. The controller may be an electronic control unit, a stability control unit, or the like. The controller, the control logic, or both may include a linear time variant observer (LTV) for estimating a position of the actuator assembly, a position of the brake piston, a position of the motor, or a combination thereof. The caliper dynamics considered for estimation of position and/or force may be non-linear. The non-linear caliper dynamics may be linearized about a particular operating state (e.g., a parking brake apply or a parking brake release) based on the estimated parking brake force through feedback linearization. The linearized operating state may provide an indication of motor load during both the parking brake apply and parking brake release operations.

The controller, the control logic, the LTV, or a combination thereof may be used to estimate a position of the motor, a position of the spindle, a position of the nut, a position of the actuator assembly, the motor speed, current draw by the motor, or a combination thereof. The LTV may relate, correlate, and/or determine a current and a voltage measurement to an estimated position of the motor or rotational angle of the motor, motor velocity, current draw by the motor, or a combination thereof. A position of the actuator assembly, the brake piston, or both can be accurately estimated based on the estimated position of the motor, which is the rotational position or angle of the motor. This is because when the output shaft of the motor is rotated, the actuator assembly and thus the brake piston or brake shoe correspondingly move because they are all rigidly connected via one or more geared and/or threaded connections. The displacement or movement of the actuator assembly, the brake piston, or both may be related to the clamp force, which may also be referred to herein as the parking brake force.

During a parking brake apply in a disc brake system, as the nut axially moves towards the bottom of the piston pocket, and the brake pads are moved towards the braking surface or the brake rotor, the parking brake force can be related to the motor position based on a suitable regression model. For example, the model may be a 1st order linear regression model, a 2nd order polynomial regression, a 3rd order regression model, a 4th order regression, etc. For example, the parking, brake force can be related to the motor position based on known system stiffness often modeled through use of a 2nd order polynomial regression. During a parking brake apply in a drum-in-hat brake system that has an internal compliance spring, the parking brake force can be related to the motor position based on a regression model such as a piecewise representation or a lookup table. In either case, a known system stiffness should be defined and analytically represented for relating position of the motor, actuator, and/or brake piston to clamping force or parking brake force.

One or more models or subcomponents may define the LTV. The one or more subcomponents may include a harness subcomponent, a state estimation subcomponent, a force estimation subcomponent, and a feedback linearization subcomponent. It is understood that one or more of the aforementioned subcomponents can be combined and/or cascaded. That is, for example, the force estimation subcomponent can be cascaded into the state estimation subcomponent and defined as a single subcomponent.

Figure 4:
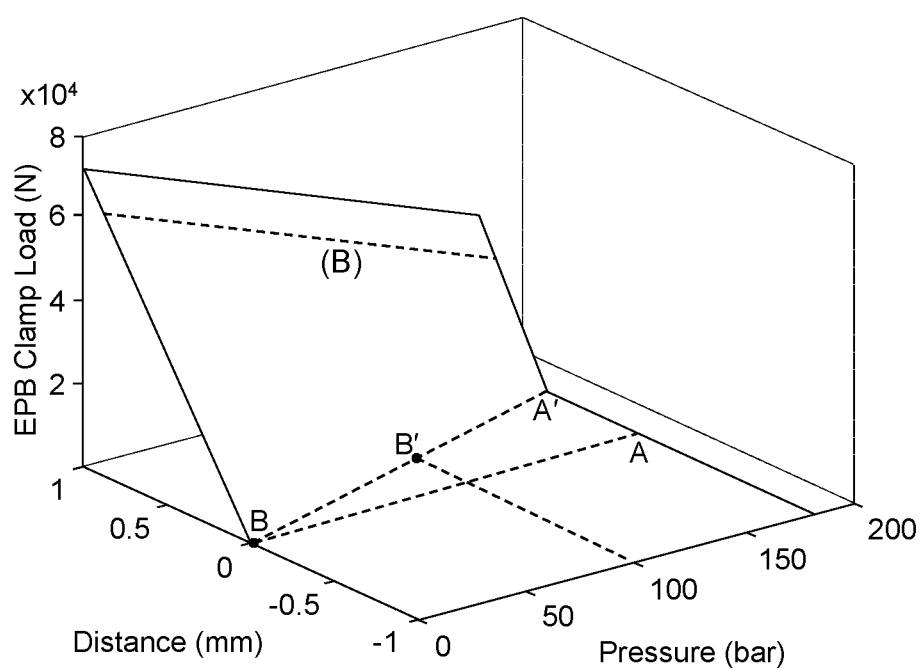
FIG. 4 illustrates a graph of clamp force, applied by a parking brake, as a function of spindle nut position and hydraulic pressure according to the present teachings.

The present disclosure provides for a method for operating an electromechanical brake system. (e.g., parking brake or "EPB"). The electromechanical brake system may be operated to adjust based on the hydraulic pressure of a hydraulic brake system (e.g., service brake or "HSB"). The adjustment may be in the apply direction and/or the release direction. Such adjustment may be based on an empirical and/or theoretical model. An exemplary model is illustrated in FIG. 4.

Typically, during a service brake operation, one or more pistons are moved towards or away from one or more brake pads via fluid pressure (i.e., of brake fluid). Typically, during a parking brake operation, one or more pistons are moved towards or away from one or more brake pads via a motor gear unit connected to one or more linkages including a spindle and a spindle nut. The present disclosure contemplates that the service brake operation can be effectuated by fluid pressure and/or a motor assembly. The present disclosure contemplates that the parking brake operation can be effectuated by a motor assembly and/or fluid pressure.

The method may comprise estimating a hydraulic pressure applied to a piston by a hydraulic brake system. The hydraulic pressure may be estimated from one or more sensor inputs. Typically, the master cylinder and/or one or more wheel cylinders comprise a sensor for measuring pressure. However, the pressure at each wheel may be different from the pressures at a master and/or wheel cylinder. Pressure at each wheel may be estimated from one or more other sensor inputs.

In the operation of the hydraulic brake system, typically a load applied to a brake pedal causes brake fluid pressure application to a master cylinder and then the brake fluid pressure is transmitted via one or more conduits to a wheel cylinder provided in the brake mechanism of each wheel. The master cylinder may be located on or proximate to a firewall. A booster may be employed to boost the load applied to the brake pedal.

The hydraulic pressure may be estimated based upon a logic table, accounting for fault or degraded conditions. Hydraulic pressure may be estimated by averaging pressures sensed at the master cylinder and/or one or more wheel cylinders. In some circumstances, one or more sensor inputs may not be available due to a fault or degraded condition. In this case, the pressure estimation may be adjusted. Accordingly, fault redundancy is provided for.

The hydraulic pressure may be estimated from a first pressure associated with a left wheel cylinder, a second pressure associated with a right wheel cylinder, a third pressure associated with a master cylinder, or any combination thereof. The first, second, and/or third pressures may be obtained from respective pressure sensors associated with the left wheel cylinder, the right wheel cylinder, and/or the master cylinder; or the first, second, and/or third pressures are estimated from another sensor input.

If both the pressure sensed at the left wheel cylinder and the pressure sensed at the right wheel cylinder are available, the estimated hydraulic pressure may be the average of both. Here, the master cylinder pressure may be ignored.

If one of the pressure sensed at the left wheel cylinder and the pressure sensed at the right wheel cylinder is available, the estimated hydraulic pressure may be the pressure sensed at the respective wheel cylinder where the pressure is available. Here, the master cylinder pressure may be ignored.

If neither the pressure sensed at the left wheel cylinder nor the pressure sensed at the right wheel cylinder are available, the estimated hydraulic pressure may be the pressure sensed at the master cylinder.

If none of the pressure sensed at the left wheel cylinder, the pressure sensed at the right wheel cylinder, and the pressure sensed at the master cylinder are available, the estimated hydraulic pressure may be set to a default value.

While the accuracy of the system may reduce as the alternative pressure input sources progress through the above alternatives, the method provides for several suitable alternatives prior to relying on a default value.

In lieu of a position sensor to determine the position of a component (e.g., spindle) of an electromechanical actuator, the present disclosure provides for a method of controlling an electromechanical actuator based ultimately upon a measured voltage and/or current of a motor. Ultimately, the position of a component (e.g., spindle) of an electromechanical actuator and/or a force applied by a component (e.g., spindle) of an electromechanical actuator may be estimated from a measured voltage and/or current of a motor. Such estimation may proceed as described with respect to FIG. 6A and FIG. 6B herein, and according to the teachings of U.S. Pat. No. 10,137,878 B2, incorporated herein by reference in its entirety for all purposes.

The position of the component (e.g., spindle) and/or the force applied by the component may be determined from a current and/or voltage of a motor of the electromechanical brake system. The position may be determined at zero-load conditions. The current and/or voltage may be related to a torque applied by the motor. The torque applied by the motor may be related to torque applied by the spindle. The torque applied by the spindle may be related to the spindle position and/or spindle force.

While the present disclosure refers to a position of a spindle nut, the linear or angular position of any component of the electromechanical brake system may be considered in the method of the present disclosure. The linear or angular positions of the spindle nut, spindle, or any component of the motor assembly can be related to each other.

In the apply operation, the electromechanical brake system may be controlled based on estimated force. That is, a force or otherwise referred to herein as a clamping force applied upon a rotor. In this regard, in order to avoid meeting or exceeding a maximum force threshold by superposition of forces associated with an electromechanical actuator system and a hydraulic actuator system, an estimated force may be employed in the control scheme.

In controlling based on estimated force, the method of the present disclosure comprises estimating a force imposed by a component (e.g., spindle) of an electromechanical actuator (e.g., indirectly via a spindle nut cooperating with the spindle and engaging a brake pad) upon a rotor.

The method may comprise correcting the estimated force applied by the electromechanical actuator based on a pressure associated with the hydraulic actuator system. Thus, with a measured or estimated pressure, the force of the electromechanical actuator may be corrected (e.g., reduced) to meet a target force and/or avoid the superposition of forces applied by the electromechanical brake system and the hydraulic brake system from exceeding a maximum force threshold. In this regard, application of unnecessary force above the target force and/or damage arising from exceeding a maximum force threshold may be mitigated and/or prevented.

Load superposition may arise from the operation of both the electromechanical brake system and the hydraulic brake system in an apply operation. In the apply operation, the electromechanical brake system and/or the hydraulic brake system may move a piston toward and/or cause a piston to apply a load to one or more brake pads. Thus, the target force of the electromechanical brake system may be adjusted, such that the combined force from the electromechanical and hydraulic brake systems is below a maximum load threshold. Such adjustment may account for the hydraulic pressure of the hydraulic brake system. Such adjustment may be made prior to, during, or after the operation of the electromechanical brake system in the apply direction.

In the release operation, the electromechanical brake system may be controlled based on position. That is, the position of a component of an electromechanical actuator system (e.g., spindle). In this regard, in order to ensure the requisite clearance between a rotor and one or more brake pads, position may be employed in the control scheme.

The method may comprise correcting the estimated position of a component of the electromechanical actuator based on a pressure associated with the hydraulic actuator system. Thus, with a measured or estimated press, the position of the electromechanical actuator may be corrected (e.g., moved in the apply or release direction, typically the release direction) to achieve a desired running clearance. In this regard, residual caliper drag may be mitigated and/or prevented.

Residual caliper drag may be generated by contact between the brake disc and one or more brake pads when braking pressure is not applied by the electromechanical and/or hydraulic brake system. Residual caliper drag may result from an insufficient running clearance between one or more brake pads and the brake disc. In a release operation of a hydraulic brake system, the load applied to a brake pad transitions from being shared between the hydraulic and electromechanical brake systems to fully applied by the electromechanical system.

Due to material elastic deformation, slippage between components, gaps between components, or any combination thereof, the load transition to the electromechanical system may cause the same to positionally shift in the release direction. The positional shift due to one or any combination of these factors may be referred to herein as relaxation or deflection. When the electromechanical brake system relaxes in a release operation, it may relax to elongate and/or travel in an apply direction, thus reducing the shifting the zero-load position of the component of the electromechanical brake system. Thus, the zero-load position may be adjusted in the release direction and the electromechanical brake system regulated to the corrected zero-load position, such that a running clearance (e.g., between about 0.5 mm and 1.5 mm) may be maintained after hydraulic pressure release.

Control of the electromechanical brake system may include closed loop estimation.

As described herein with respect to FIG. 4, an empirical and/or theoretical model may relate pressure associated with a hydraulic actuator system to force as well as position. FIG. 4 is merely an exemplary model, and the present teachings are not intended to be limited to this model. Thus, where control is based on force, the pressure can be related to the force, and where control is based on position, the pressure can be related to the position. Stated differently, a force applied by the hydraulic actuation system is associated with the pressure of the hydraulic actuation system, and a shift in the zero-load position of the electromechanical actuation system is associated with the pressure of the hydraulic actuation system. The force applied by the hydraulic actuation system and the shift in the zero-load position of the electromechanical actuation system may be calculated, estimated, or otherwise determined from the pressure.

FIG. 1 illustrates a fault redundancy scheme. Inputs associated with the front left wheel (FL), front right wheel (FR), rear left wheel (RL), and rear right wheel (RR) are considered. As taught herein, wheel speed can be employed to determine if the vehicle is static or dynamic. Speed is determined at each wheel. Thus, if one or more of the inputs are unavailable, the method can rely on other inputs or a pre-determined value.

Generally, the method determines the maximum wheel speed for diagonal pairs of wheels (e.g., front left and rear right). The method then determines the minimum value, from the two maximums determined from each diagonal wheel pair. This minimum value is the estimated wheel speed.

If inputs from either of the front wheels are unavailable, the method relies on the corresponding rear wheel in the diagonal pair. If inputs from both of the front wheels or inputs from either of the rear wheels are unavailable, then the method sets the estimated speed to a fault value.

FIG. 2A illustrates a graph of grade ranges. Each grade range is separated by a threshold (T1, T2, and T3). The depicted graph is merely exemplary and greater or fewer discrete grade ranges are contemplated by the present teachings. As taught herein, longitudinal acceleration can be employed to determine grade. Grades can be separated into discrete ranges and a load to which an electromechanical actuator is regulated can be assigned to each grade range.

FIG. 2B illustrates a graph of target load as a function of grade. In addition to or alternative to the method of FIG. 2A, the load may be regulated according to a linear (dashed line), non-linear (dot-dash line), or piecewise (solid line) relationship as a function of grade.

FIG. 3A illustrates a graph of a parking brake and service brake operating parameters as a function of time. The present disclosure is concerned, at least in part, with the operation between (3) and (4), where force superposition occurs, and between (5) and (6) where the running clearance between the brake pads and the brake disc returns.

At (2), the zero-load travel of the electromechanical brake system ("electric parking brake" or "EPB") ceases and the electromechanical brake system contributes to the load applied to brake pads. While the electromechanical brake system and the hydraulic brake system ("hydraulic service brake" or "HSB") are operational, the method of the present disclosure accounts for the hydraulic pressure of the hydraulic brake system to determine the travel of the spindle nut required so that the combined load of the electromechanical brake system and the hydraulic brake system does not meet and/or exceed a maximum recommended load (A). Between (3) and (4), the hydraulic pressure of the hydraulic brake system is released, and the total load applied to the brake pads shifts completely to the electromechanical brake system. Due to relaxation of the electromechanical brake system when the hydraulic brake system is released, a spindle nut of the electromechanical brake system travels a distance ("deflects") in the release direction, although the electromechanical brake system is in an applied position.

Between (4) and (5), EPB Load and Total Load are 28845 N, HPS Load is 0 N, Motor Current is 0 A, Motor Speed is 0 RPM, Motor Voltage is 0 V, Motor Drive Torque is 0 Nm, Pressure is 0 bar, Spindle Position is 0.522 mm, and Deflection is 0.522 mm.

Figure 3B:
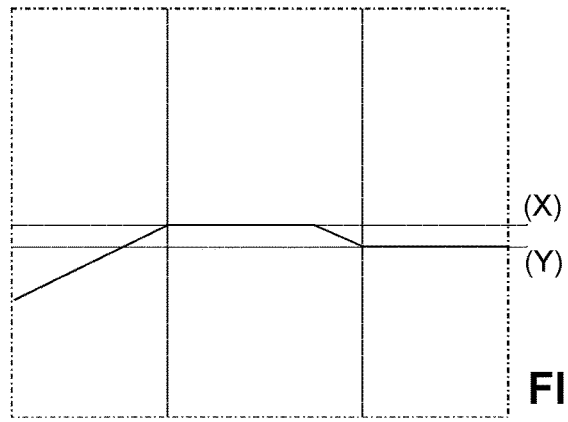
FIG. 3B illustrates an enlarged excerpt of the graph of FIG. 3A.

At (5), the electromechanical brake system releases its load on the brake pad and the position of the spindle nut returns to a zero-load position between (5) and (6). At (6), there is a running clearance. The method of the present disclosure accounts for the hydraulic pressure to determine the deflection of the spindle nut attributed to relaxation of the electromechanical brake system, depicted as the difference between (Y) and (X) in FIG. 3B. The method of the present disclosure accounts for relaxation in the target load such that after relaxation, the desired load is achieved. Without accounting for relaxation, the zero-load position (between (5) and (6)) may be skewed by the difference between (Y) and (X). In some circumstances, where the difference between (Y) and (X) meets or exceeds the running clearance between the brake pads and a brake disc, residual caliper drag may result.

The hydraulic pressure is accounted for by an empirical or theoretical model, such as illustrated in FIG. 4. The present disclosure contemplates that the model of FIG. 4 is merely exemplary and may be unique to different types of brake systems; and/or different vehicle makes, models, model years, and/or trim levels.

FIG. 4 illustrates a graph of clamp force, applied by a parking brake, as a function of spindle nut position and hydraulic pressure. The position (x-axis) of the spindle nut actuated by an electromechanical brake system is related to the clamp load (y-axis) applied by the electromechanical brake system upon brake pads. Considering only the x and y axes, as the spindle nut position moves in an apply direction (positive direction), the clamp load increases past the zero-load position. Point B indicates the zero-load position where the spindle nut contacts but does not apply a load to a piston.

As hydraulic pressure (z-axis) is applied to a piston by the hydraulic brake system, the position of the piston shifts in the apply direction and the zero-load position of the spindle nut adjusts correspondingly in the apply direction. The zero-load position adjusts along Line A' (e.g., Point B') and thus the electromechanical brake system may adjust the position of the spindle nut by the difference between the x-axis coordinates of Point B and any point along Line A' (e.g., Point B').

If hydraulic pressure is not accounted for, the running clearance when hydraulic pressure is released may be reduced by the difference between the x-axis coordinates of Point B and any point along Line A' (e.g., Point B').

Line (B) indicates a maximum load in the model. Thus, where a hydraulic pressure is applied to a piston, the electromechanical brake system can adjust in its operation to avoid meeting or exceeding the maximum EPB clamp load when pressure is released.

Figure 5:
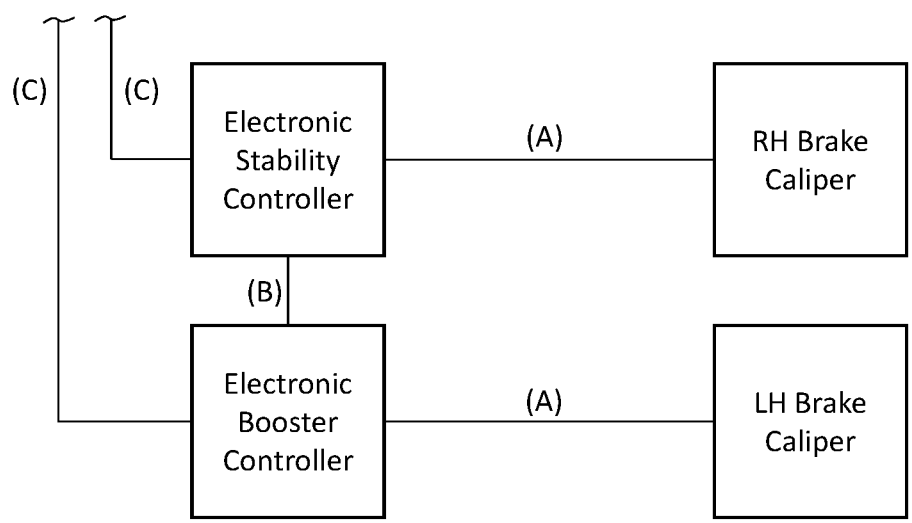
FIG. 5 illustrates a fault redundancy scheme according to the present teachings.

FIG. 5 illustrates a schematic of decoupled architecture. The electromechanical brake system (e.g., parking brake) of each of the left-hand and right-hand brake calipers is operated by a separate controller. The controllers communicate with the respective brake calipers (lines (A)), each other (line (B)), and existing vehicle systems (line (C)).

While FIG. 5 depicts the electronic stability controller dedicated to the right-hand brake caliper and the booster controller dedicated to the left-hand brake caliper, the present disclosure contemplates that an opposite arrangement may be employed. The present disclosure also contemplates that any other vehicle controller may operate any brake caliper.

Upon the occurrence of a fault or degraded condition (e.g., disablement of the right-hand electromechanical actuator), the fault or degraded condition may be communicated by the faulted/degraded brake caliper's controller to the other controller, which orders the operational brake caliper (e.g., by the electromechanical brake system) to apply a maximum default load to the rotor. Thus, a static state of the vehicle can be ensured.

FIG. 6A illustrates a flow diagram or control model of the linear time variant ("LTV") 10 that is contained within the controller. Because a position sensor is not used in this parking brake system to determine a position of the motor, the actuator assembly, and/or the brake piston, the LTV 10 is used to accurately estimate motor position, actuator position, spindle position, nut position, or a combination thereof. The LTV 10 is also used to accurately estimate motor speed or velocity and motor current. The control logic architecture of the LTV 10 comprises various models that can be combined or cascaded. The models of the LTV 10 include a harness model 12, a state estimation model 14, a force estimation model 16, and a linearization model 18.

The harness model 12 may be a model of the vehicle harness from the controller to the actuator assembly. Current 20 and voltage 22 of the motor is measured at the harness model 12. Before the electromechanical actuator system is actuated, the load on the motor is known to be zero. Accordingly, an input voltage 22 and input current 20 to the motor is known.

After the electromechanical actuator system is actuated and load on the motor increases in order to create or release the parking brake, the motor draws additional current (i.e., motor current) from a source to keep the motor running in order to actuate and move the motor gear unit ("MGU"), the actuator assembly, the brake pads, or brake shoes, etc. to create the clamping force. As the current draw by the motor increases, the voltage at the motor terminals drops due to the harness resistance. This change in current is measured at the harness model 12. A resistance of the harness is taken into consideration in these measurements, and the motor voltage is determined based on the measured current and measured voltage at the harness model. A motor current measurement 24 and a motor voltage measurement 26 of the motor is output from the harness model 12 and input into the state estimation model 14.

The state estimation model 14 (associated with the motor dynamics and gear dynamics discussed with respect to FIG. 6B) is a model used to estimate motor position, motor velocity, and/or motor current. The state estimation model 14 may be a linearized, state space model of the actuator assembly. The motor position, motor velocity, and/or motor current is estimated based on the current 24 and voltage 26 measurements from the harness model 12. One or more of the motor position, motor velocity, and motor current are contained in Xhat 28, which is an output of the state estimation model 14. The estimated motor position (contained within Xhat 28) is output from the state estimation model 14 and input into the force estimation model 16. As shown and discussed with respect to FIG. 6B, the state estimation model 14 takes into consideration motor dynamics 30 and gear dynamics 32. The estimated states (e.g., motor position, motor velocity and/or motor current; contained within Xhat 28) is output from the state estimation model 14 and fed back into the state estimation model 14 to provide an error correction term based on estimated and measured current, as will be discussed further below.

The force estimation model 16 is a model used to estimate clamp force 36, which may be used herein interchangeably with the parking brake force. The force estimation model 16 may provide a force model that can be implemented as a polynomial regression, or a lookup table for estimating the clamp force 36. In the force estimation model 16, clamp force 36 is estimated based on the estimated motor position 34 and pressure 38 associated with a hydraulic actuator system (e.g., service brake). However, the clamp force 36 can be estimated based also, or instead, on the estimated motor current and/or estimated motor speed. The estimated clamp force 36 may be, for example, a 2nd order polynomial regression of the estimated motor position 34. Estimated motor position 34 and estimated clamp force 36 is output from the force estimation model 16.

During the parking brake apply, the clamp force is the amount of force created when the brake pads or brake shoes are pressed against a braking surface (e.g., brake rotor or brake drum, respectively) to restrict or prevent movement of a wheel or vehicle. During release of the parking brake, the clamp force is reduced so that the wheel or vehicle can once again move.

One skilled in the art may understand that over time the friction material of the brake pads and brake shoes typically wear, thus requiring the brake pads and shoes to be moved further towards a braking surface to create sufficient clamp force. Accordingly, to compensate for this additional required movement of not only the brake pads and shoes but also the actuator assemblies, the motor position changes to create the required clamp force. Thus, the LTV 10 continuously updates to compensate for this wear and the corresponding changes in the position of the motor and/or actuator. These updates are accomplished at the force estimation model 16, which is centered at a zero-clearance condition when the brake pads or brake shoes begin to engage the rotor or drum, respectively.

The clamp force 36 output from the force estimation model 16 is input into the linearization model 18. The output of the linearization model 18 is an estimate of the motor load torque 40, which linearizes the state estimation model 14 (i.e., estimated motor position, motor velocity, motor current) using feedback linearization. The estimated motor load torque 40 is fed into the state estimation model 14 along with the estimated states (i.e., Xhat; estimated motor position, estimated motor velocity; estimated current draw by the motor, or a combination thereof) that is output from the state estimation model 14. By using motor load torque 40 feedback into the state estimation model 14, the system is represented in state space representation where the state A matrix, as defined in Equations 20 and 22 below, is a time variant matrix (i.e., A(t)). Feedback linearization about the motor operating load 40 provides the correct linear state space formation for estimation of the internal states (Xhat) using equations 36 through 39 below.

FIG. 6B illustrates the LTV 10 defined by a parametric system model. The parametric system model can be described by a motor dynamics subcomponent 30, a gear dynamics subcomponent 32, a spindle dynamics subcomponent 42, and a parking brake dynamics subcomponent 44. One or more models or subcomponents may define the LTV.

During the parking brake apply, or release of the parking brake, as the motor is loaded, the motor draws additional current, which, as was discussed above, is an output measurement from the harness model 12. Motor speed 46 and motor current 24 are estimated as outputs from the motor dynamics model 30. Motor speed 46 and motor current 24 are estimated based on the voltage 26 measurement output and motor load torque 40. The motor speed 46 and correspondingly spindle position 48 is used to determine a motor load torque 40, which is fed back into the motor dynamics model 30 so that the LTV 10 can continuously update the motor position 34. Spindle speed 50 is based on the motor speed 46 and is output from the gear dynamics model 32 and input into the spindle dynamics model 42 to determine a spindle torque 52 based on the load force feedback from the park brake dynamics 44. A position 54 of the spindle is related to the spindle speed 50. The spindle position 54 is output from the spindle dynamics model 42, and input into the park brake dynamics 44. The spindle force 56 is output from the park brake dynamics 44 and also fed back into the spindle dynamics model 42 so that the LTV 10 can continuously update the spindle position 54 to spindle force 56 as the brake pads or brake shoes wear over time. The spindle load force 58 is related to the clamp force 36 discussed in FIG. 6A.

The motor dynamics subcomponent 30 may be modeled using Kirchoff's Voltage Law, Torque balance equations, and/or Ohm's Law. The input voltage 22 to the motor may be derived from an observed electronic control current and voltage using a nominal vehicle harness resistance. The generated motor torque ($K_t i$) and back electromotive force (EMF) voltage may be a function of the measured current 24, motor speed 46, and a motor constant. The motor terminal voltage may be estimated based on the harness resistance and current observation 24 based on Ohm's Law. The motor voltage (U) may be equated as the measured ESC voltage ($V_{esc}$) minus the harness voltage drop ($iR_r$) as shown in EQ1.

$$U = V_{esc} - iR_r \qquad \text{EQ1}$$

The rate of current 24 change in the parametric system model can be represented as the applied motor voltage (U), minus the back EMF voltage and resistance drop within the circuit, as shown in EQ2, where L represents the circuit inductance, R the circuit resistance, and $K_b$ the motors back EMF constant.

$$\frac{dI}{dt} = -\frac{iR}{L} - \frac{K_b \theta}{L} + \frac{1}{L}U \qquad \text{EQ2}$$

Within the torque balance equations, the inertia (J) may consist of a motor component in addition to an equivalent reflected inertia from the actuator assembly, including the spindle and the nut. For high reduction systems, as is typical of motor on caliper systems, the equivalent downstream inertia can often be ignored due to equivalent inertia having the relationship of $1/R^2$. Motor acceleration may therefore be a function of the motor torque ($K_t i$), minus the motor load torque ($T_m$) 40 and viscous losses due to internal damping (v), as shown in EQ3.

$$\frac{d\theta}{dt} = -\frac{T_m}{J} - \frac{v\theta}{J} + \frac{K_t i}{J} \qquad \text{EQ3}$$

The gear dynamics subcomponent 32 may be a model of the amplified motor torque ($T_m$) applied to the actuator assembly. The total amplification may be a function of the lumped reduction ratio ($R_t$) and gear efficiency ($\eta_t$). This relationship may be indicated by EQ 4, where spindle torque is represented by $T_s$.

$$T_m(t) = \frac{T_s(t)}{R_t \eta} \qquad \text{EQ4}$$

The spindle dynamics 42 may be a model of the spindle and nut. The parking brake force, F(t), may be related to the spindle torque ($T_s(t)$), based on one or more spindle and nut parameters. The relationship between the parking brake force F(t) and spindle torque ($T_s(t)$) may be dependent on the particular operating mode of the spindle (e.g., whether the spindle is being operating during a parking brake apply or release of the parking brake) and may be represented as a piecewise equation with respect to a motor and/or spindle velocity. Due to the self-locking effect between the spindle and the nut, there is considerable stiction (i.e., friction that prevents the spindle and nut from being set in motion) within the actuator assembly when transitioning from static to dynamic friction. Accordingly, because estimation only is only valid during non-zero motor speed, the actuator assembly stiction can be ignored and the dominant friction during operation can be considered dynamic.

The spindle torque equations for both a parking brake apply and release of the parking brake may be defined by equations EQ5 and EQ6, respectively. The spindle factor equations ($SF_{sa}$, $SF_{sr}$) can be expressed in one or more forms for symmetric and non-symmetric threads. For example, the spindle factors $SF_{sa}$, $SF_{sr}$ can be expressed by EQ7 and EQ8, respectively. The spindle parameters may include one or more parameters, such as spindle friction, effective spindle diameter dm, spindle lead l, and spindle flank angle α. The bearing parameters may include bearing friction $\mu_{db}$ and effective bearing diameter $d_b$. The spindle and bearing parameters (SF) may be evaluated using adaptive control methods to address degradation of the parking brake system over time. Combining EQ5 and EQ7 and EQ6 and EQ8 yields EQ9 and EQ 10, respectively.

$$T_{sa}(t) = SF_{sa} F(t) \qquad \text{EQ5}$$

$$T_{sr}(t) = SF_{sr} F(t) \qquad \text{EQ6}$$

$$SF_{sa} = \frac{d_m}{2}\left[\frac{l + \pi\mu_{ds} d_m \sec \alpha}{\pi d_m - \mu_{sd} l \sec \alpha}\right] + \frac{\mu_{db} d_b}{2} \qquad \text{EQ7}$$

$$SF_{sr} = \frac{d_m}{2}\left[\frac{\pi\mu_{ds} d_m \sec \alpha - l}{\pi d_m + \mu_{sd} l \sec \alpha}\right] + \frac{\mu_{db} d_b}{2} \qquad \text{EQ8}$$

$$T_{sa}(t) = \frac{F(t) d_m}{2}\left[\frac{l + \pi\mu_{ds} d_m \sec \alpha}{\pi d_m - \mu_{sd} l \sec \alpha}\right] + \frac{F(t)\mu_{db} d_b}{2} \qquad \text{EQ9}$$

$$T_{sr}(t) = \frac{F(t) d_m}{2}\left[\frac{\pi\mu_{ds} d_m \sec \alpha - l}{\pi d_m + \mu_{sd} l \sec \alpha}\right] + \frac{F(t)\mu_{db} d_b}{2} \qquad \text{EQ10}$$

The park brake dynamics 44 and, correspondingly, the brake piston displacement can be related to the generated parking brake force (F(t)) based on system stiffness characteristics. The system stiffness characteristics can be represented by a suitable regression model, such as a 1st order regression model, a 2nd order regression, a 3rd order, a 4th order regression model, etc. For example, the system stiffness can be represented by the characteristic shown in EQ16 and EQ17 for the parking brake apply and release of the parking brake, respectively. In a disc brake system, the parking brake force (F(t)) can be implemented by two regression coefficients C1 & C2. These regression coefficients C1 & C2 can further be refined as a function of both temperature and wear to form a model of piston position to parking brake force (F(t)). The parking brake force (F(t)) can correspondingly be substituted within EQ9 and EQ10 to represent spindle torque ($T_s(t)$) as a function of piston position and spindle factor (SF).

$$F(t) = C1x(t)^2 + C2x(t) \quad \text{EQ11}$$

$$T_{sa}(t) = SF_{sa}[C1x(t)^2 + C2x(t)] \quad \text{EQ12}$$

$$T_{sr}(t) = SF_{sr}[C1x(t)^2 + C2x(t)] \quad \text{EQ13}$$

The park brake dynamics 44 can be represented using state space notation. The overall efficiency of the parking brake system can be lumped into a single representation for use in adaptive control. This single representation may consist of one or more parameters, such as motor, MGU, bearing, and spindle efficiency parameters. The lumped spindle factor is described below in EQ14 and EQ15 for the parking brake apply and release of the parking brake, respectively. The motor load torque ($T_m$) 40 representation is described in EQ16 and EQ17 after substituting EQ14 and EQ15 into the motor load torque equation EQ4 and the spindle torque equations EQ9, EQ10, respectively.

$$SF'_{sa} = \frac{SF_{sa}}{R_t \eta} \quad \text{EQ14}$$

$$SF'_{sr} = \frac{SF_{sr}}{R_t \eta} \quad \text{EQ15}$$

$$T_{ma}(t) = \frac{T_{sa}(t)}{R_t \eta} = \frac{SF_{sa}[C1x(t)^2 + C2x(t)]}{R_t \eta} = SF'_{sa}F(t) \quad \text{EQ16}$$

$$T_{mr}(t) = \frac{T_{sr}(t)}{R_t \eta} = \frac{SF_{sr}[C1x(t)^2 + C2x(t)]}{R_t \eta} = SF'_{sr}F(t) \quad \text{EQ17}$$

The parking brake system can be represented in nonlinear formation. The internal chosen states of the system can be motor position (θ), motor velocity ({grave over (θ)}), and motor current (i) System observations are described by the state output (y) and are given for only motor current (i). This motor current observation (i) is made by the control unit, electronic stability controller, or equivalent vehicle hardware. The LTV 10 may rely on knowledge of the input voltage (U) 22 and motor current (i) 24 observations to correct its state estimations (predictor corrector).

$$\frac{d}{dt}\begin{bmatrix} \theta \\ \dot{\theta} \\ i \end{bmatrix} = \begin{bmatrix} \dot{\theta} \\ -\frac{SF'_{si}F(x)}{J} - \frac{v\theta}{J} + \frac{K_t i}{J} \\ -\frac{iR}{L} - \frac{k_b \dot{\theta}}{L} \end{bmatrix} + \begin{bmatrix} 0 \\ 0 \\ \frac{1}{L} \end{bmatrix} U \quad \text{EQ18}$$

$$y = [0 \ 0 \ 1]\begin{bmatrix} \theta \\ \dot{\theta} \\ i \end{bmatrix} \quad \text{EQ19}$$

The motor load torque ($T_m$) 40 represented in equations EQ16 and EQ17 can be evaluated as a time varying parameter to linearize the state space representation in EQ18 about the current operating motor load. The linearization may be completed through feedback to the state estimation model 14 in order to update the model 14 in discrete time. The linearized state space formation is shown in equations EQ20-EQ23. This feedback linearization allows for the use of the linear time variant estimation of motor position (θ), motor velocity ({grave over (θ)}), and motor current (i). This feedback linearization is represented by Fx(t) in EQ22 below.

$$\{\text{grave over } (\dot{x})\}(t) = A(t)x(t) + Bu(t) \quad \text{EQ20}$$

$$y(t) = Cx(t) + Du(t) \quad \text{EQ21}$$

$$\frac{d}{dt}\begin{bmatrix} \theta \\ \dot{\theta} \\ i \end{bmatrix} = \begin{bmatrix} 0 & 1 & 0 \\ -\frac{SF'_{si}F_x(t)}{J\theta} & -\frac{v}{J} & \frac{K_t}{J} \\ 0 & -\frac{K_b}{L} & -\frac{R}{L} \end{bmatrix}\begin{bmatrix} \theta \\ \dot{\theta} \\ i \end{bmatrix} + \begin{bmatrix} 0 \\ 0 \\ \frac{1}{L} \end{bmatrix} U \quad \text{EQ22}$$

$$y = [0 \ 0 \ 1]\begin{bmatrix} \theta \\ \dot{\theta} \\ i \end{bmatrix} \quad \text{EQ23}$$

Observability (Ob) may refer to a how well the internal states of the system (i.e., motor position (θ), motor velocity ({grave over (θ)}), and motor current (i)) can be inferred by knowledge of its external outputs. A system may be observable if for any possible sequence of state and control vectors, the current state can be determined in finite time using only the outputs. This quality may be evaluated by checking the rank of the observability matrix of equations EQ34 and EQ35. All of the parameters within the observability matrix of EQ35 may be constant time invariant parameters except for the generated parking brake force ($F_x(t)$). The generated parking brake force ($F_x(t)$) may be a time variant parameter. The generated parking brake force ($F_x(t)$) can take on either a positive, real representation of the parking brake force, or a value of zero. In the case of generation or the parking brake force, the observation matrix may be of full rank, which may correspond to complete observability. Complete observability may mean that all internal system states can be estimated based on the motor current (i) observation.

During a parking brake apply, the parking brake force and position of the motor, actuator assembly, or both may be coupled and provide for a predictor corrector relationship so that the estimates are corrected based on the defined system dynamics.

$$Ob = \begin{bmatrix} C \\ CA \\ CA^2 \\ \vdots \\ CA^{n-1} \end{bmatrix} \quad \text{EQ34}$$

$$Ob = \begin{bmatrix} 0 & 0 & 1 \\ 0 & -\frac{K_b}{L} & -\frac{R}{L} \\ \frac{K_b}{L}\frac{SF'_{si}F_x(t)}{\theta J} & \frac{K_b}{L}\frac{v}{J} + \frac{R}{L}\frac{K_b}{L} & -\frac{K_b}{L}\frac{K_t}{J} + \left(\frac{-R}{L}\right)^2 \end{bmatrix} \quad \text{EQ35}$$

The theoretical representation of the LTV 10 with gain (L) may be provided in equations EQ36 and EQ37 for continuous time and equations EQ38 and EQ39 for discrete time representation. The gain (L) can be chosen using pole placement techniques to meet system response specifications. Because the system dynamics are time variant, in case of pole placement design criteria, the gain parameters within the vector L are chosen based on the current operating state such that L=f(F) or correspondingly L=f($T_m$).

$$\dot{\hat{x}} = A\hat{x} + L[y - C\hat{x}] + Bu \qquad \text{EQ36:}$$

$$\hat{y} = C\hat{x} + Du \qquad \text{EQ37:}$$

$$\hat{x}(k+1) = A(k)\hat{x}(k) + L[y(k) - \hat{y}(k)] + Bu(k) \qquad \text{EQ38:}$$

$$\hat{y}(k) = C\hat{x}(k) + Du(k) \qquad \text{EQ39:}$$

Another benefit of the state space methodology may be that the estimated and the measured motor current can be used to adapt internal model-based parameters over the life of the actuator assembly. In other words, the spindle factor ($SF_{sa}$, $SF_{sr}$) can be lumped with a thrust bearing and MGU efficiency and adapted based on an error between the estimated and measured motor current. This degradation adaptation can be used to adapt the overall parking brake system efficiency within the LTV 10 to account for degradation of the actuator assembly. This adaptation desirably decreases the overall estimation error and/or reduces control variation of force and position, which thereby allows for decreased system sizing. Which may ultimately result in reduced weight and system costs. The degradation adaptation can be achieved using equation EQ40 and weighted with respect to prior adaptations to minimize variations in the spindle factor ($SF_{sa}$, $SF_{sr}$) according to EQ41, where ω is a weight assigned to each adaptation where the sum of the weights is equal to 1.

$$SF'_{si}(k) = SF'_{si}(k-1) + C[i_{clamp}(k-1) - i_{clamp}(k-1)] \qquad \text{EQ40}$$

$$SF'_{si}(k) = \sum_{i=0}^{n} \omega_i SF'_{si}(k-i) \qquad \text{EQ41}$$

It is understood that the above description is intended to be illustrative and not restrictive. Accordingly, the specific embodiments as set forth herein are not intended as being exhaustive or limiting of the teachings. Many embodiments as well as many applications besides the examples provided will be apparent to those of skill in the art upon reading the above description. Those skilled in the art may adapt and apply the present teachings in its numerous forms, as may be best suited to the requirements of a particular use. Other combinations are also possible as will be gleaned from the following claims, which are also hereby incorporated by reference into this written description.

The scope of the present teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate, plural elements or steps.

The disclosure of "a" or "one" to describe an element or step is not intended to foreclose additional elements or steps.

While the terms "first", "second", "third", etc., may be used herein to describe various elements, components, regions, layers, and/or sections, these elements, components, regions, layers, and/or sections should not be limited by these terms. These terms may be used to distinguish one element, component, region, layer, or section from another element, component, region, layer, or section. These terms do not imply a sequence or order unless clearly indicated by the context. Thus, a first element, component, region, layer, or section could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (e.g., rotated 90 degrees or at other orientations) and the spatially relative descriptors used herein interpreted accordingly.

The terms "generally" or "substantially" to describe angular measurements may mean about +/−10° or less, about +/−5° or less, or even about +/−1° or less. The terms "generally" or "substantially" to describe angular measurements may mean about +/−0.010 or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, components, or steps identified, and such other elements, components, or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

The disclosures of all articles and references, including patent applications and publications, are incorporated by reference for all purposes.

What is claimed is:

1. A method of controlling an electromechanical brake system, the method comprising:
   measuring a voltage of a motor;
   measuring a current of the motor;
   estimating a position of a component of the electromechanical brake system based on the voltage and the current;

estimating a force imposed by the component based on the voltage and the current; and estimating a hydraulic pressure associated with a hydraulic brake system;

wherein in an apply operation, the estimated force of the component is corrected based on the hydraulic pressure; and wherein in a release operation, the estimated position of the component is corrected based on the hydraulic pressure.

2. The method according to claim 1, wherein the hydraulic pressure is estimated from a sensor input; and wherein the sensor input is determined based upon a logic table, accounting for fault or degraded conditions.

3. The method according to claim 2, wherein the hydraulic pressure is estimated from a first pressure associated with a left wheel cylinder, a second pressure associated with a right wheel cylinder, a third pressure associated with a master cylinder, or any combination thereof; and wherein the first, second, and/or third pressures are obtained from respective pressure sensors associated with the left wheel cylinder, the right wheel cylinder, and/or the master cylinder; or the first, second, and/or third pressures are estimated from another sensor input.

4. The method according to claim 3, wherein if both the first pressure sensed at the left wheel cylinder and the second pressure sensed at the right wheel cylinder are available, the estimated hydraulic pressure is an average of both;

wherein if only one of the first pressure sensed at the left wheel cylinder and the second pressure sensed at the right wheel cylinder is available, the estimated hydraulic pressure is the first pressure or the second pressure, whichever is available;

wherein if neither the first pressure sensed at the left wheel cylinder nor the second pressure sensed at the right wheel cylinder are available, the estimated hydraulic pressure is the third pressure sensed at the master cylinder; and wherein if none of the first pressure sensed at the left wheel cylinder, the second pressure sensed at the right wheel cylinder, and the third pressure sensed at the master cylinder are available, the estimated hydraulic pressure is set to a default value.

5. The method according to claim 1, wherein the component is a spindle nut, a spindle, a component of a motor assembly, or any combination thereof.

6. The method according to claim 5, wherein the component is the spindle.

7. The method according to claim 6, wherein the method further comprises:

rotating the spindle about an axis with the motor in a first direction so that the spindle nut moves one or more brake pads against a braking surface; and/or rotating the spindle about the axis with the motor in a second direction so that the one or more brake pads move away from the braking surface.

8. The method according to claim 1, wherein in the apply operation, said correction mitigates and/or prevents damage arising from a load superposition of the electromechanical brake system with the hydraulic brake system; and wherein in the release operation, said correction mitigates and/or prevents damage arising from residual caliper drag.

9. The method according to claim 1, wherein control of the electromechanical brake system is closed loop.

10. The method according to claim 1, wherein the method further comprises:

estimating a vehicle grade; and regulating the electromechanical brake system to an applied force imposed by the component based on the vehicle grade.

11. The method according to claim 10, wherein the method further comprises obtaining a longitudinal acceleration of a vehicle; wherein the vehicle grade is estimated based on the longitudinal acceleration.

12. The method according to claim 11, wherein in the event of fault or degraded conditions, the applied force is set to a default force; and wherein the fault or degraded conditions include no longitudinal acceleration being available, the longitudinal acceleration exceeding a maximum value, the longitudinal acceleration falling below a minimum value, or any combination thereof.

13. The method according to claim 11, wherein the method further comprises obtaining a wheel speed; wherein the wheel speed determines if the vehicle is static or dynamic; and wherein the vehicle grade is only estimated if the vehicle is static.

14. The method according to claim 13, wherein the wheel speed is a minimum value of a maximum wheel speed of a first diagonal wheel set, including a front left wheel and a rear right wheel, and a maximum wheel speed of a second diagonal wheel set, including a front right wheel and a rear left wheel.

15. The method according to claim 14, wherein in the event of fault or degraded conditions for the front left wheel or the front right wheel, a wheel speed of a corresponding rear wheel in the first diagonal wheel set or the second diagonal wheel set is considered in determining the minimum value;

wherein in the event of fault or degraded conditions for both of the front left wheel and the front right wheel, the wheel speed is set to a default value; and wherein in the event of fault or degraded conditions for either of the rear left wheel or the rear right wheel, the wheel speed is set to the default value.

16. The method according to claim 13, wherein if the wheel speed is below a static threshold for a pre-determined duration, the vehicle is assumed static; and wherein if the wheel speed is above a dynamic threshold for the pre-determined duration, the vehicle is assumed dynamic.

17. The method according to claim 11, wherein the applied force is determined based upon the vehicle grade.

18. The method according to claim 17, wherein the applied force is determined by the vehicle grade falling within discrete ranges of vehicle grades and/or the applied force is modelled as a function of the vehicle grade; and wherein the function is linear, non-linear, or piecewise.

19. The method according to claim 1, wherein the method further comprises:

detecting, by a first controller, a fault or degraded condition associated with a first brake caliper to which the first controller is assigned;

communicating, by the first controller, the fault or degraded condition to a second controller assigned to a second brake caliper; and setting a force associated with the second brake caliper to a default force.

20. The method according to claim 19, wherein the first controller and the first brake caliper are located on a passenger side of a vehicle; and the second controller and the second brake caliper are located on a driver side of the vehicle, or vice versa.

* * * * *